Sept. 4, 1934.  C. J. COBERLY  1,972,215
METHOD OF CUTTING SLOTS WITH NONCIRCULAR JET
Filed Feb. 7, 1933
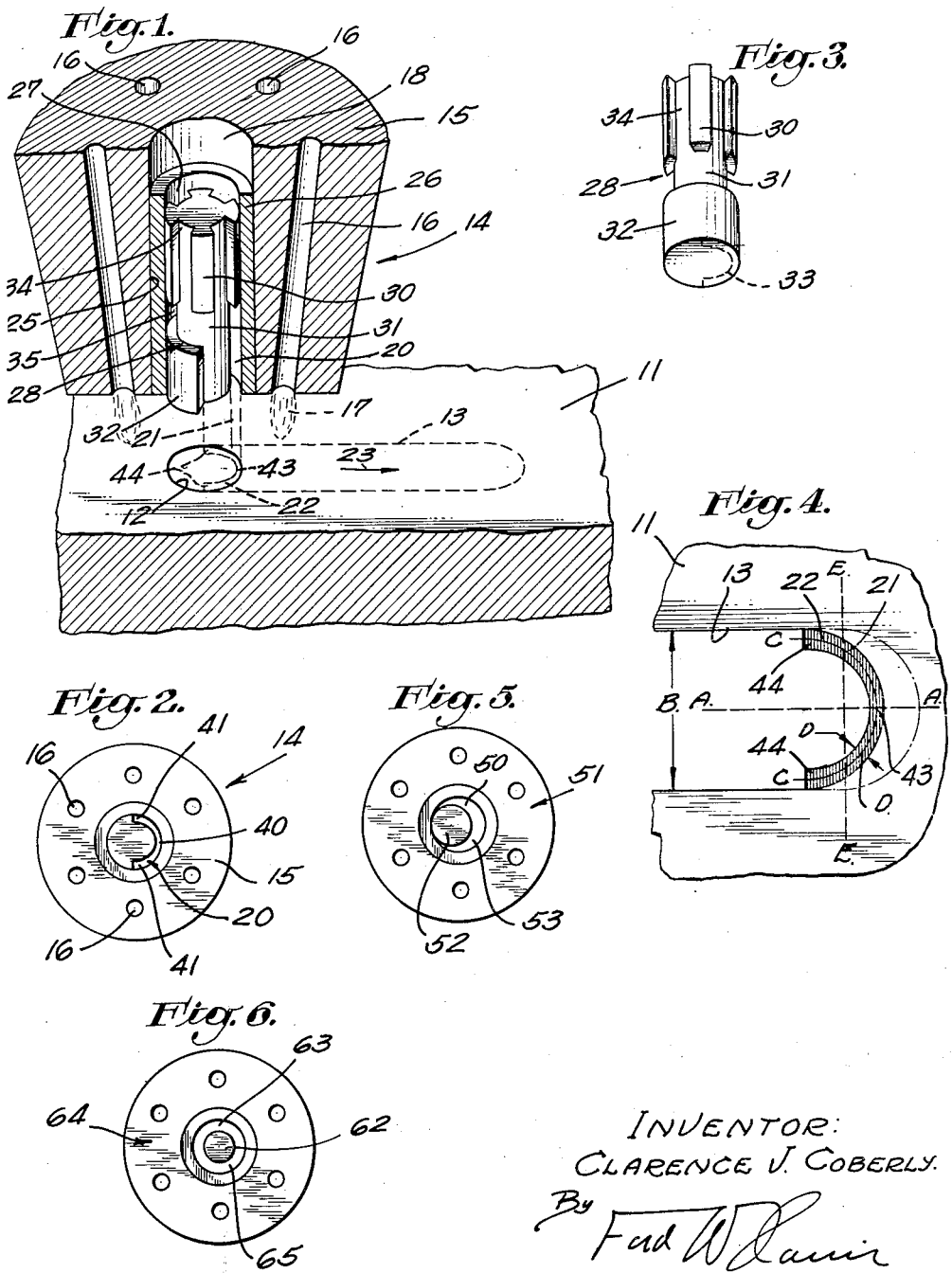
INVENTOR:
CLARENCE J. COBERLY.
By Fred W. Lamir
ATTORNEY.

Patented Sept. 4, 1934

1,972,215

UNITED STATES PATENT OFFICE 1,972,215

METHOD OF CUTTING SLOTS WITH NONCIRCULAR JET

Clarence J. Coberly, Huntington Park, Calif., assignor to Kobe, Inc., Huntington Park, Calif., a corporation of California Application February 7, 1933, Serial No. 655,606

4 Claims. (Cl. 148—9)

My invention relates to a method of cutting slots whereby a slot may be cut in a piece of metal by use of an oxygen jet or other cutting-gas jet with considerable economy.

This application is a continuation-in-part of my application entitled Cutting torch tip with non-circular orifice, Serial No. 501,832, filed December 12, 1930.

My invention has for its principal object to enable the cutting of a slot in metal with the use of a much less amount of oxygen or other cutting-gas than is required in cutting slots under the present methods.

My invention has a particular utility in cutting slots in screen pipe such as are employed in the oil producing industry, but it also has considerable utility in those industries wherein sheets of metal are cut by use of the ordinary type of oxyacetylene cutting torches.

It is an object of my invention to form a cutting-gas jet of such a shape that it will cut a slot in metal with the use of much less cutting-gas than is employed in present methods.

In the preferred form of my invention I provide a cutting-gas jet in which the longitudinal axis or the longitudinal center line of the cutting jet in a transverse plane is disposed across or transversely of the slot to be cut, or is disposed substantially on a plane or symmetrically on a plane which extends transversely of the longitudinal axis of the slot to be cut. In the form of my invention which has proven to be most satisfactory, the cutting jet is non-circular in cross section and is preferably arcuated and in cross section consists of a relatively narrow annulus which may be completely annular, that is, a full circle, or may be partly annular, that is, a part circle.

In practicing my present invention, the metal to be cut is properly heated by directing preheating flames against the metal. When the metal has been raised to proper temperature so that it will burn when the cutting-gas jet is applied thereto, I then direct a jet of cutting-gas, which is preferably non-circular, through the metal with the longitudinal axis of the cutting-gas jet extending across or transversely of the slot to be cut. The cutting-gas jet is then moved along the metal to form the slot. In practicing my invention I have found that I am able to cut slots in metal by using only 20% of the cutting-gas ordinarily employed in the common methods of cutting slots.

Other objects of my invention will be pointed out when the preferred forms thereof are described.

Referring now to the drawing in which apparatus for performing my invention is illustrated.

Fig. 1 is a fragmentary sectional view showing a cutting torch tip construction by means of which my invention may be practiced, and a plate in which a slot is to be cut in accordance with the teachings of my invention.

Fig. 2 is a bottom plan view of the cutting torch tip shown in Fig. 1.

Fig. 3 is a perspective elevation of the plug or orifice forming member of the cutting torch tip shown in Fig. 1, Fig. 3 showing this member prior to the time that channels or passages are formed therein.

Fig. 4 is a fragmentary view which illustrates the shape of the cutting jet which is employed in my method and the proper orientation of the cutting jet with respect to the slot which is being cut.

Figs. 5 and 6 disclose alternative forms of my invention.

In Fig. 1 of the drawing, I show a portion of a metal plate 11 in which a starting hole 12 has been drilled preparatory to the cutting of a slot in the plate 11, as indicated by the dotted line 13. This starting hole is not necessary to my invention, but is only desirable since it has been proved in practice that the starting end of the slot may be cut very accurately if a starting hole is provided. On the other hand, if the invention is to be used merely for cutting a piece of metal into two parts, the cut will be made at the edge of the metal and no starting hole will be necessary. In this application, however, I am disclosing my invention in connection with the forming of slots such as are employed in screen pipe for oil well use. I do not, however, wish such description to in any way limit my present invention to the forming of slots or to this particular art.

Disposed in a position concentric to the axis of the starting hole 12 and in a position thereabove, as disclosed in Fig. 1, is a cutting torch tip 14 which may be used in the practice of my invention. This torch tip 14 includes a body 15 having a plurality of passages 16 therein through which a combustible gas mixture, such as oxygen and acetylene, may be conducted to feed heating flames 17, as indicated by dotted lines of that number. The cutting torch tip has a cutting-gas passage 18 through which the cutting-gas is carried to a discharge orifice 20, this discharge orifice, as shown in Fig. 2, being arcuate in form and extending through an arc of substantially 180°. From this discharge orifice 20 a cutting jet 21 issues, such jet 21 being arcuate in form, as indicated by dotted lines 22 in Fig. 1 and as indicated by full lines 22 in Fig. 4. The cutting jet 21 is preferably arcuate and is relatively narrow in width and is relatively long on its longitudinal axis. When the term "longitudinal axis" is used, I mean the longest center line of the jet in a plane which extends parallel to the upper surface of the metal which is to be cut or the axis which lies in the plane of the plate, as shown in Fig. 4.

Referring again to Fig. 2, the jet 21 passes through the rightward portion of the starting hole 12, and when the heating flames 17 have heated the walls of the plate 11 surrounding the starting hole 12 to such an extent that combustion of the metal of the plate 11 will occur in the presence of the cutting-gas of the cutting jet 21, the cutting torch tip is moved in the direction of the arrow 23 shown in Fig. 1 along the path defined by the dotted lines 13 so as to cut a slot in the plate 11 of the width and length demarcated by the dotted lines 13. It will be seen that when the cutting torch tip is moved as described, the cutting-gas jet is moved along the metal so as to cut or burn the metal in order to form a slot.

Referring now to Fig. 4, I will point out the exact formation of the cutting-gas jet 21 which is of a preferred type, and the manner in which it is orientated with respect to the slot 13. The slot 13 is cut on a longitudinal axis A—A shown in Fig. 4. The axis A—A is relatively long, while the width of the slot, as indicated by B, is relatively small. The cutting-gas jet 21, as explained, is arcuate and therefore it has a longitudinal axis C—C which is curved as shown. The cutting-gas jet 21 is relatively thin in the direction at right angles to any portion of the axis C—C, as indicated at D in Fig. 4. In practicing my invention, the cutting-gas jet 21 must be disposed across the slot 13 and may therefore be considered as being disposed symmetrically on a transverse line E—E. It is one of the features of my invention to utilize in the cutting of a slot a cutting jet which extends entirely across the slot to be cut, that is, which has a longitudinal axis which extends across the slot to be cut and which is relatively thin or relatively narrow in a direction parallel to the longitudinal axis A—A of the slot to be cut. By so arranging the cutting-gas jet, I am able to cut a slot with the astounding economies pointed out heretofore, namely, by the use of approximately 20% of the cutting-gas ordinarily employed in present methods in cutting the same type of slot as can be cut with my invention.

The cutting-gas jet is so formed that it issues against the metal which is to be removed by combustion and against no other part of the metal of the plate 11. There is no portion of the cutting-gas jet which is wasted and consequently I can cut a slot with great economy. I have found by a series of experiments that a substantial portion of the gas used in cutting jets of circular cross section is wasted, as it is only the forward portion of the cutting jet which is utilized in the cutting operation. In other words, to cut a slot as indicated by the dotted lines 13 in Fig. 1 and by full lines 13 in Fig. 4, the cross section of a cutting-gas jet necessary for the cutting of such a slot is indicated by the dotted lines 22 in Fig. 1 and full lines in Fig. 4, as the dotted lines 22 define the forward portion of a circular area lying adjacent the metal which must be cut away in order to form the slot. The arcuate area of the jet 21, indicated by the dotted lines 22, is substantially 20% of the circular area of the starting hole 12 which has the same diameter as the width or gauge of the slot indicated by the dotted lines 13; therefore, it logically follows that by using a jet 21 of non-circular cross section instead of a jet corresponding in cross section to the starting hole 12, I accomplish a saving in cutting-gas of approximately 80% of that ordinarily employed.

In order that those skilled in the art may know how to construct an apparatus by which my invention may be very economically performed, I have shown the torch disclosed in Figs. 1, 2, and 3 and will describe same briefly as follows: In the lower end 25 of the cutting-gas passage 18 a sleeve 26 is inserted having a bore or opening 27 therethrough, selected with respect to the width of the slot to be cut. A plug 28, inserted in the opening 27 of the sleeve 26, is so formed that the opening 27 through the sleeve 26 is obstructed with the exception of the orifice 20. The plug 28 is formed from a body having an inner body portion 30, and interconnecting portion 31 of reduced diameter, and a lower or outer body portion 32, the diameters of the portions 30 and 32 corresponding to the diameter of the opening 27. To form the orifice 20 a portion of the outer body portion 32, indicated by dotted lines 33 in Fig. 3, is cut away so that when the plug is inserted in the opening 27 the arcuate discharge orifice 20 will be formed between the outer body portion 32 and the lower wall of the sleeve 26. A plurality of longitudinal slots 34, cut in the inner body portion 30, provides passages through which cutting-gas may flow from the passage 18 into an annular space 35 surrounding the interconnecting portion 31 to the orifice 20. The inner body portion 30 provides a means for holding the outer body portion 32 in proper position at the lower end of the opening 27 through the sleeve 26.

The outer body portion 32 is so cut that the width of the central portion 40 of the orifice 20 will be less than the width of the ends 41 of the orifice 20, in order that a greater volume of gas will pass downwardly at the sides of the jet 21, in accordance with my findings that the amount of cutting-gas required at the front portion 43 of the cutting jet is less than the amount of gas required at the sides 44 thereof. Therefore, in the preferred form of my invention, I employ a cutting-gas jet which is slightly narrower at 43 than it is at the points 44. However, it will be seen that the distance D may be uniform throughout without greatly changing the economies effected by the method of my invention. In other words, if desired, the distance D could be that which is at points 44 and even at the point 43. Under these circumstances there would be a slight excess of gas in the cutting-gas jet at the forward part of the cutting-gas jet.

Another form of cutting-gas jet which may be utilized in my invention is produced by the type of cutting tip shown in Fig. 5. In that figure, the lower end of a gas passage 50 of a torch tip 51 is obstructed by a cylindrical plug 52, of smaller diameter than the opening 50, and in an eccentric position so as to leave a crescent-shaped orifice 53 which approximates the arcuate shape of the orifice 20 shown in Figs. 1 and 2. Although the orifice 53 would not produce a cutting-gas jet which would be as efficient as is utilized in the preferred form of my invention, nevertheless a slot could be cut with much more economy than under present methods.

In Fig. 6 I disclose a cutting torch tip which would produce another design of cutting-gas jet which could be employed in the method of my invention. In this figure, there is a concentric plug 62 placed in a central position in a discharge passage 63 of a torch tip 64 in order to provide a completely annular orifice 65. In this form of torch tip the cutting-gas jet would be completely annular, but only the front or forward portion thereof would actually be used for cutting purposes. The rearward portion, however, would be wasted.

From the foregoing description it will be seen that my invention is of great value in those industries wherein slots are cut by use of oxy-acetylene cutting torches or their equivalent. My invention is broadly new and I therefore wish to have it construed in accordance with the scope of the appended claims.

I claim as my invention:

1. The method of cutting a slot in a metal plate, comprising: forming a starting hole in said plate; heating the metal surrounding said hole to a temperature producing combustion in the presence of a cutting-gas; directing a cutting-gas jet of arcuate cross section through said hole; and moving said jet along the path of the slot desired to be cut.

2. The method of cutting a slot in a metal plate, comprising: forming a starting hole in said plate; heating the metal surrounding said hole to a temperature producing combustion in the presence of a cutting-gas; directing a cutting-gas jet of arcuate cross section through said hole with a curved outer portion of the jet faced in the direction of the slot to be cut; and moving said jet in the direction of such slot.

3. A method of cutting a slot in a metal plate, comprising: heating the metal plate to a desired temperature; passing through the said metal plate a cutting-gas jet which on its cross section is relatively long on a longitudinal axis and relatively narrow in width, said cutting-gas jet being directed through the metal plate so that said longitudinal axis of the cutting-gas jet extends transversely of the longitudinal axis of the slot to be cut; and moving said cutting-gas jet parallel to the longitudinal axis of said slot to be cut.

4. A method as defined in claim 3 in which said cutting-gas jet is arcuate in cross section and in which the end portions thereof are slightly thicker than the central portion thereof.

CLARENCE J. COBERLY.